United States Patent
Bjontegaard

(10) Patent No.: US 8,310,596 B2
(45) Date of Patent: Nov. 13, 2012

(54) METHOD RELATED TO NOISE REDUCTION

(75) Inventor: Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 866 days.

(21) Appl. No.: 12/374,125

(22) PCT Filed: Jul. 13, 2007

(86) PCT No.: PCT/NO2007/000270
§ 371 (c)(1),
(2), (4) Date: Apr. 29, 2009

(87) PCT Pub. No.: WO2008/010724
PCT Pub. Date: Jan. 24, 2008

(65) Prior Publication Data
US 2009/0323827 A1    Dec. 31, 2009

(30) Foreign Application Priority Data

Jul. 19, 2006 (NO) .................................. 20063345
Jun. 25, 2007 (NO) .................................. 20073201

(51) Int. Cl.
*H04N 5/00* (2006.01)
*H04N 7/12* (2006.01)
(52) U.S. Cl. .................................. 348/607; 375/240.27
(58) Field of Classification Search .................. 348/607; 375/240.27
See application file for complete search history.

(56) References Cited

U.S. PATENT DOCUMENTS

| | | | |
|---|---|---|---|
| 4,694,342 A | | 9/1987 | Klees |
| 5,585,859 A | | 12/1996 | Ward et al. |
| 6,067,125 A | | 5/2000 | May |
| 6,259,489 B1 | | 7/2001 | Flannaghan et al. |
| 6,335,990 B1 | | 1/2002 | Chen et al. |
| 6,847,408 B1 * | | 1/2005 | Webb .......................... 348/607 |
| 6,907,143 B2 | | 6/2005 | Ferguson |
| 7,034,892 B2 | | 4/2006 | Ojo |
| 7,199,838 B2 | | 4/2007 | Lin et al. |
| 2002/0101543 A1 | | 8/2002 | Ojo |
| 2005/0248687 A1 * | | 11/2005 | Lee et al. .................... 348/606 |
| 2005/0280739 A1 | | 12/2005 | Lin et al. |

FOREIGN PATENT DOCUMENTS

| | | |
|---|---|---|
| WO | 97 39572 | 10/1997 |
| WO | 98 46009 | 10/1998 |
| WO | 01 35657 | 5/2001 |
| WO | WO 2005/122588 A1 | 12/2005 |

OTHER PUBLICATIONS

Extended Supplementary European Search Report dated Aug. 27, 2010 in corresponding European Application No. 07 79 3922.

* cited by examiner

*Primary Examiner* — Jay Patel
*Assistant Examiner* — Richard Torrente
(74) *Attorney, Agent, or Firm* — Oblon, Spivak, McClelland, Maier & Neustadt, L.L.P.

(57) ABSTRACT

A pre-processing of video data before coding and transmission, for a method for noise reduction in High-Density video images. A low implementation-complex filter filters raw pixel data output of a video camera with a low pass property for both spatial and temporal noise and the filter is adapted based on the high frequency content of the picture, leaving most of the image content unaffected by the filtering process.

6 Claims, 3 Drawing Sheets

$$\begin{array}{cc} \text{Old} & \text{New} \\ a_r\ b_r\ c_r & a_p\ b_p\ c_p \\ d_r\ e_r\ f_r & d_p\ e_p\ f_p \\ g_r\ h_r\ i_r & g_p\ h_p\ i_p \end{array}$$

METHOD RELATED TO NOISE REDUCTION

FIELD OF THE INVENTION

The invention is related to noise reduction of pixels in video images captured by light sensors in a digital video camera.

BACKGROUND OF THE INVENTION

Transmission of moving pictures in real-time is employed in several applications like e.g. video conferencing, net meetings, TV broadcasting and video telephony and are becoming more widespread.

These applications require digital cameras and digital camcorders containing electronic image sensors that capture light for processing into a still or video image, respectively. The quality specifications for the image sensors are increasing as the conventional image resolution is becoming larger. The general factor influencing the image quality the most is the image noise. A large level of noise will generally degrade the quality of the images. Noise may result from different processes taking part in the formation of the image. The characteristics of the noise may also be different. There may be certain patterns due to physical processes or the noise may take the form of a more statistical character often somewhat vaguely named as "Gaussian".

Most of the noise is created in the image sensors. The image sensors usually include an array of photosensitive elements in series with switching elements. Each photosensitive element receives an image of a portion of the scene being imaged. That portion is called a picture element or pixel. The image obtaining elements produce an electrical signal indicative of the image plus a noise component. Various techniques have been used in the art to minimize the noise, to thereby produce an output signal that closely follows the image. There are two primary types of electronic image sensors, charge coupled devices (CCDs) and complimentary metal oxide semiconductor (CMOS) sensors. CCD image sensors have relatively high signal to noise ratios (SNR) that provide quality images. Additionally, CCDs can be fabricated to have pixel arrays that are relatively small while conforming with most camera and video resolution requirements. A pixel is the smallest discrete element of an image. For these reasons, CCDs are used in most commercially available cameras and camcorders.

CMOS sensors are faster and consume less power than CCD devices. Additionally, CMOS fabrication processes are used to make many types of integrated circuits. Consequently, there is a greater abundance of manufacturing capacity for CMOS sensors than CCD sensors.

To date there has not been developed a CMOS sensor that has the same SNR and pixel pitch requirements as commercially available CCD sensors. Pixel pitch is the space between the centers of adjacent pixels. It would be desirable to provide a CMOS sensor that has relatively high SNR while providing a commercially acceptable pixel pitch.

CCD sensors contain pixel arrays that have multiple rows and columns. When capturing first and second images a CCD must read every row from the array for the first image and then every row in the array for the second image. This is a relatively inefficient approach that contains inherent delays in data retrieval. It would be desirable to decrease the time required to retrieve data from the pixel array.

All light sensors in arrays are exposed to noise due to their spatial and discrete nature. Some light photons simply do not hit the sensors, and consequently contribute to the noise picture. Another noise contributor is the quantization of the light captured by the respective sensors. The representation of the pixel values is digital, i.e. discrete, and conversion from analog to digital data also introduce quantization errors. The amounts of these errors depend on the quantization intervals, which in turn depend on the number of digits representing each pixel. In digital cameras this number has to be limited due to limited processing power and memory space.

The generated noise is often large enough to visually degrade the image. It is therefore desirable to be able to reduce the noise level to obtain a subjectively better image.

At the same time, the rate of picture elements (pixels) in a high quality video signal is very large. For a high definition (HD) video signal this may be in the order of 100 mega pixels/s. This means that a noise reduction method must take computational complexity into account and try to make the procedure simple enough to be feasible for real time implementation.

SUMMARY OF THE INVENTION

The present invention provides a method of noise reduction of a video image being composed of succeeding pictures, including the steps of consecutively calculating a respective delta value ($\Delta$) for each pixel in a present picture of the succeeding pictures from a function of weighted pixels in said present picture and/or in a reference picture relative to said present picture, adjusting said respective delta value to a corresponding respective adjusted delta value ($\Delta'$) according to an amount of high frequency content in said present picture and/or in said reference picture, and adding said respective adjusted delta value for each respective pixel in said present picture.

BRIEF DESCRIPTION OF THE DRAWINGS

In order to make the invention more readily understandable, the discussion that follows will refer to the accompanying drawing.

DETAILED DESCRIPTION OF THE PRESENT INVENTION

Figure 1:
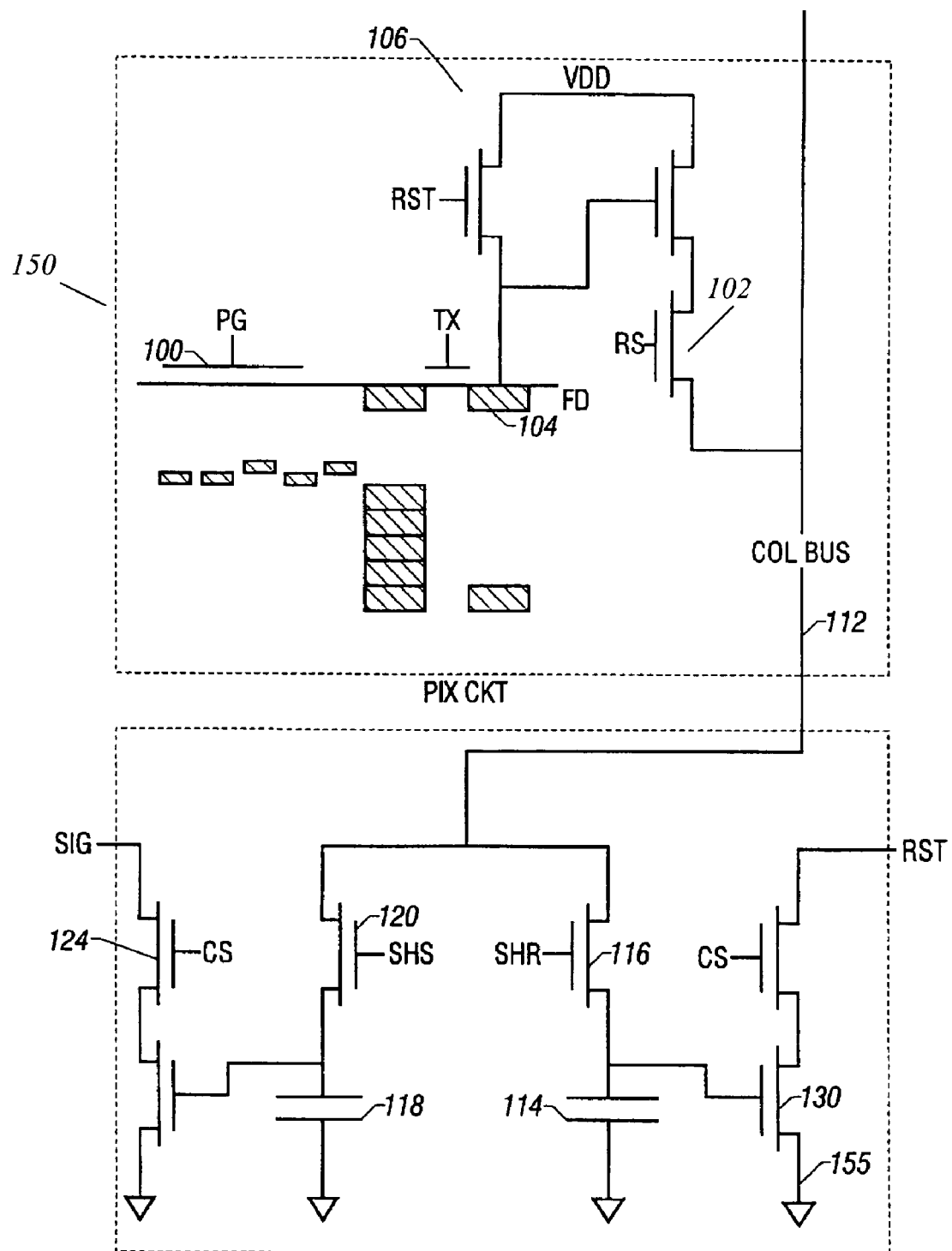
FIG. 1 shows a basic block diagram of a CMOS active pixel circuit.

A block diagram of an example of a CMOS active pixel circuit as mentioned in the background section is shown in FIG. 1. The device has a pixel circuit 150, and a column circuit 155. Incident photons pass through the photogate ("PG") 100 in the pixel circuit 150 and generate electrons which are integrated and stored under PG 100. A number of the pixel circuits are arranged in each row of the circuit. One of the rows is selected for readout by enabling the row selection transistor 102 ("RS").

The floating diffusion output node 104 ("FD") is first reset by pulsing reset transistor ("RST") 106. The resultant voltage on FD 104 is read out from the pixel circuitry onto the column bus 112 using the source follower 110 within the pixel. The voltage on the column bus 112 is sampled onto a first holding capacitor 114 by pulsing transistor SHR 116. This initial charge is used as the baseline.

The signal charge is then transferred to FD 104 by pulsing PG 100 low. The voltage on FD 104 drops in proportion to the number of photoelectrons and the capacitance of FD. The new voltage on the column bus 112 is sampled onto a second capacitor 118 by pulsing SHR 120. The difference between the voltages on first capacitor 114 and second capacitor 118 is therefore indicative of the number of photoelectrons that were allowed to enter the floating diffusion. This voltage difference forms the basis for the quantized output pixel value, one for luminance (luma), and one for chrominance (chroma).

However, the voltage difference is derived from the photons hitting the photogate, but because of the discrete nature of the photogate arrays some photons will hit the space between the photogates, and will not affect the circuit deriving the voltage difference. Due to this fact and the quantization of the analogue voltage, there will always be a noise contribution to the pixel-made image. In video images, the noise will also be temporal, implying that the noise is seen to influence both the temporal and spatial resolution of the video signal.

Figure 2:
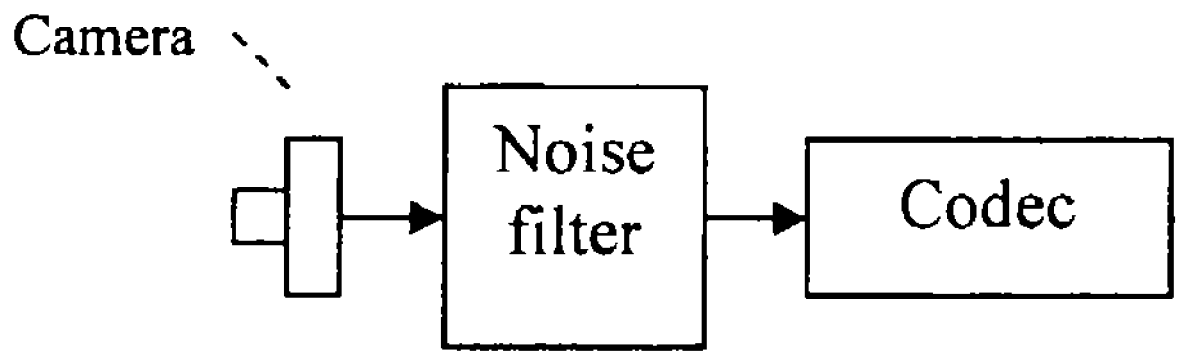
FIG. 2 is illustrates a noise filter according to the present invention used in a video conference terminal.

The main object of the present invention is to reduce as much of the noise as possible and at the same time leave as much of the signal as possible untouched. This is realized by a low implementation-complex filter e.g. arranged between the camera and the codec in a video conference terminal as shown in FIG. 2, with low pass property for both spatial and temporal noise combined with an adaptation of the filter based on the high frequency content of the picture, leaving most of the image content unaffected by the filtering process.

The present invention will in the following be exemplified by describing an embodiment of the invention.

Figures 3, 4:
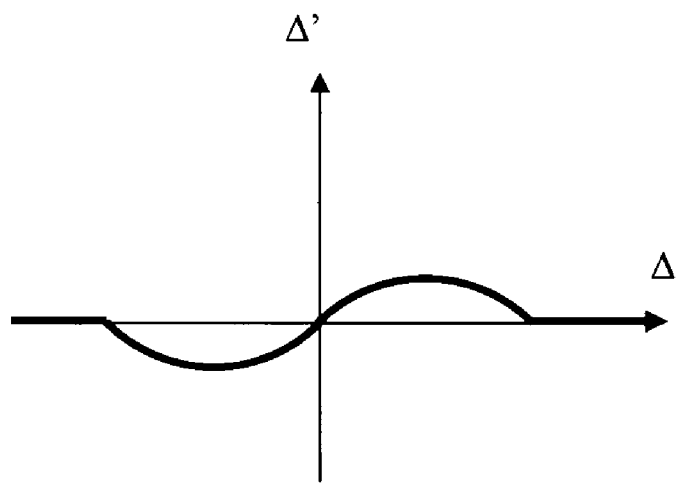
FIG. 3 shows the notation of the pixels in a present and a reference picture used in the description.
FIG. 4 shows a relation between the delta value and the adjusted delta value according to one embodiment of the invention.

In FIG. 3 is shown notations of an extraction of pixels in a present (new) and a former (old) reference picture of a video image. Pixels $a_r$ to $i_r$ belong to "Old", and it is assumed that all pixels in "old" have already been filtered. Then there is a present picture called "New" with the notation $a_p$ to $i_p$. In the present definition it is assumed that pixels $a_p$ to $d_p$ have already undergone filtering.

The filtering process (both for luma and one for chroma) according to the present invention is defined by how pixel $e_p$ is modified to $e_p'$. In the presently described embodiment this process is defined as follows:

$$\Delta=(4e_r+2f_r+g_r+2h_r+i_r+a_p+2b_p+c_p+2d_p)/16-e_p \quad (1)$$

A simple modification of n would then be to add the delta value calculated in (1), i.e. $e_p'=e_p+\Delta$ This first iteration of a modification of $e_p$ would have a low pass filtering effect both temporally and spatially, since the filtering taps correspond to pixels in both "old" and "new". Unfortunately this would affect high frequency content of the image too much. Thus, there should preferably be an assumption as to how large the noise contribution to $e_p$ may be. If $\Delta$ is larger than this contribution, it should be assumed that this is due to real picture content and consequently, $e_p$ should not be modified.

One solution is then first to modify $\Delta$ to $\Delta'$ in a way similar to the illustration below so that $\Delta' \approx \Delta$ for small $\Delta$ and $\Delta=0$ for large $\Delta$. This is illustrated in FIG. 4 as $\Delta'$ as a function of $\Delta$.

This function can analytically be expressed as follows:

$$\Delta'=\Delta*\max(0;(k_0-k_1*|\Delta|)/k_0) \quad (2)$$

Where $k_0$ and $k_1$ are constants, and $e_p'$ is still defined as $e_p'=e_p+\Delta'$.

Note that the filtering described so far is more temporal than spatial since the largest contribution of $\Delta$ comes from "Old".

Hence, a first aspect of the embodiment described above would be to define two versions of $\Delta$, one weighted towards temporal filtering, and one towards spatial filtering. The one to use depends on the difference compared with the pixel value in the same pixel position in the former picture.

To exemplify, $\Delta_t$ is defined as in (1) since it is weighted towards temporal filtering:

$$\Delta_t=(4e_r+2f_r+g_r+2h_r+i_r+a_p+2b_p+c_p+2d_p)/16-e_p \quad (3)$$

Further, $\Delta_s$ which is the weighted towards spatial and is defined as:

$$\Delta_s=(4e_r+2f_p+g_p+2h_p+i_p+a_p+2b_p+c_p+2d_p)/16-e_p \quad (4)$$

If $|e_p-e_r|$ is small it is assumed that it is desirable to do more temporal filtering, whereas if $|e_p-e_r|$ is large we want to do primarily spatial filtering. Consequently, the combination of these two expressions can be defined as in the following:

$$\Delta=w*\Delta_s+(1-w)*\Delta_t \quad (5)$$

where w depends on the pixel value difference $|e_p-e_r|$.

In this first aspect of the above described embodiment of the present invention, the filter adapts to temporal or spatial filtering depending on the picture content.

A second aspect of the above-described embodiment takes into account that noise tends to be more annoying in dark areas than in light areas of a picture. In this aspect, the filter strength, which is determined by $k_1$ in (2), varies according to the luminance value, which will be equal to $e_p$ for luma filtering and a luma value near $e_p$ for chroma filtering. According to this aspect $k_1$ is inversely proportional with $e_p$ so as to increase as the luminance decrease and vice versa. Then the filtering process is stronger at darker parts of the picture and more noise is thus removed.

Calculation of $\Delta$ above is a typical example, but the invention also covers different weighting factors on the different pixels as well as different selection of pixels. For example, it covers more implementation friendly calculations of $\Delta$ and $e_p'$, e.g as the following for $\Delta$:

$$\Delta=2e_r+(a_p+c_p+1)\!>\!>\!1+2[(b_p+d_p+1)\!>\!>\!1]+ \\ (g_r+i_r+1)\!>\!>\!1+2[(f_r+h_r+1)\!>\!>\!1]-8e_p$$

where >>1 means right shift by 1.

Note that the embodiment described above does not limit the scope of the present invention, and a person skilled in the art might realize many other aspects of the embodiment. The invention is not limited to videoconferencing only, but is applicable in all applications where digital video image capturing is involved.

The invention claimed is:

1. A method of noise reduction of a video image being composed of succeeding pictures, the method comprising:
consecutively calculating a respective delta value ($\Delta$) for each pixel in a present picture of the succeeding pictures from a function of weighted pixels in said present picture and in a reference picture relative to said present picture;
adjusting said respective delta value to a corresponding respective adjusted delta value ($\Delta'$) according to an amount of high frequency content in said present picture and in said reference picture; and
adding said respective adjusted delta value for each respective pixel in said present picture, the consecutively calculating said delta value comprising:

providing a first version of said function of weighted pixels, weighted towards temporal filtering, providing a second version of said function of weighted pixels, weighted towards spatial filtering, and selecting the version to use in dependency on the difference between each version of the delta value and the pixel value in the same pixel position in the former picture.

2. A method according to claim 1, wherein said second version of said function of weighted pixels, weighted towards temporal filtering and calculating said respective delta value for a pixel ($e_p$) in the present picture, is defined as:

$$\Delta=(4e_r+2f_r+g_r+2h_r+i_r+a_p+2b_p+c_p+2d_p)/16-e_p,$$

wherein the weighted pixels are positioned adjacent to $e_p$ and weighted pixels with p-subscripts are included in the present picture and weighted pixels with r-subscripts are weighted pixels from the reference picture.

3. A method according to claim 1, wherein said first version of said function of weighted pixels, weighted towards temporal filtering and calculating said respective delta value for a pixel ($e_p$) in the present picture, is defined as:

$$\Delta=2e_r+(a_p+c_p+1)>>1+2[(b_p+d_p+1)>>1]+\\(g_r+i_r+1)>>1+2[(f_r+h_r+1)>>1]-8e_p$$

wherein the weighted pixels are positioned adjacent to $e_p$ and weighted pixels with p-subscripts are included in the present picture and weighted pixels with r-subscripts are weighted pixels from the reference picture, and >>1 is defined as a right shift by 1 in a shift register.

4. A method according to claim 1, wherein said function of weighted pixels calculating said respective delta value for a first pixel ($e_p$) in the present picture is defined as:

$$\Delta=w*\Delta_s+(1-w)*\Delta_t,$$

wherein w is a value between 0 and 1 being proportional to $|e_p-e_r|$, and $e_r$ is a second pixel in the reference picture positioned equally as said first pixel, $\Delta_s$ is defined as:

$$\Delta_s=(4e_r+2f_p+g_p+2h_p+i_p+a_p+2b_p+c_p+2d_p)/16-e_p$$

and $\Delta_t$ is defined as:

$$\Delta_t=(4e_r+2f_r+g_r+2h_r+i_r+a_p+2b_p+c_p+2d_p)/16-e_p.$$

5. A method according to claim 1, wherein said respective adjusted delta value is defined as:

$$\Delta'=\Delta*\max(0;(k_0-k_1*|\Delta|)/k_0),$$

wherein $k_0$ and $k_1$, are constants.

6. A method according to claim 1, wherein the video image is a video image captured by a camera used for video conferencing.

* * * * *